May 19, 1942.         A. A. FOSTERMAN ET AL         2,283,247
                        HOG RESTRAINING DEVICE
                    Filed Nov. 2, 1940           2 Sheets-Sheet 1

INVENTORS
Alvin A. Fosterman
Louis O. Marshall
BY Sam J. Slotsky
ATTORNEY.

May 19, 1942.   A. A. FOSTERMAN ET AL   2,283,247
HOG RESTRAINING DEVICE
Filed Nov. 2, 1940   2 Sheets-Sheet 2

INVENTORS
Alvin A. Fosterman
Louis O. Marshall
BY Sam J. Slotsky
ATTORNEY.

Patented May 19, 1942

2,283,247

UNITED STATES PATENT OFFICE 2,283,247

HOG RESTRAINING DEVICE

Alvin A. Fosterman, Utica, S. Dak., and Louis O. Marshall, Verdigree, Nebr.

Application November 2, 1940, Serial No. 363,988

5 Claims. (Cl. 119—98)

Our invention pertains to a restraining device for hogs.

An object of our invention is to provide a readily controllable restraining device which allows the hogs to pass therein, and which hogs are then quickly and firmly held.

A further object of our invention is to provide a restraining device which will restrain or firmly hold all portions of the animal so that it can be treated at any desired portion such as near the ear or, if necessary, in abdominal portions.

A further object of our invention is to provide a restraining device which can be made readily adjustable to accommodate different sizes of pigs or hogs, with manually controlled adjustable arrangements which can be operated very quickly.

A further object of our invention is to provide a carriage member which bears the animal, and which carriage member includes features to prevent injury to the legs of the animal.

A further object of our invention is to provide a receiving framework which, besides accomplishing the above mentioned objects, can be pivoted or swung over to a horizontal position so that the lower portions of the animal can be operated on.

A further object of our invention is to provide spring urged means normally assisting the raising action of the animals in combination with the above mentioned objects.

A further object of our invention is to provide a retaining frame or structure which can be operated to quickly receive the animals for treatment and also quickly allow release of the same so that a large number of pigs or hogs can be treated in a minimum time.

A further object of our invention is to provide a structure of this type which is simply constructed.

Figure 1:
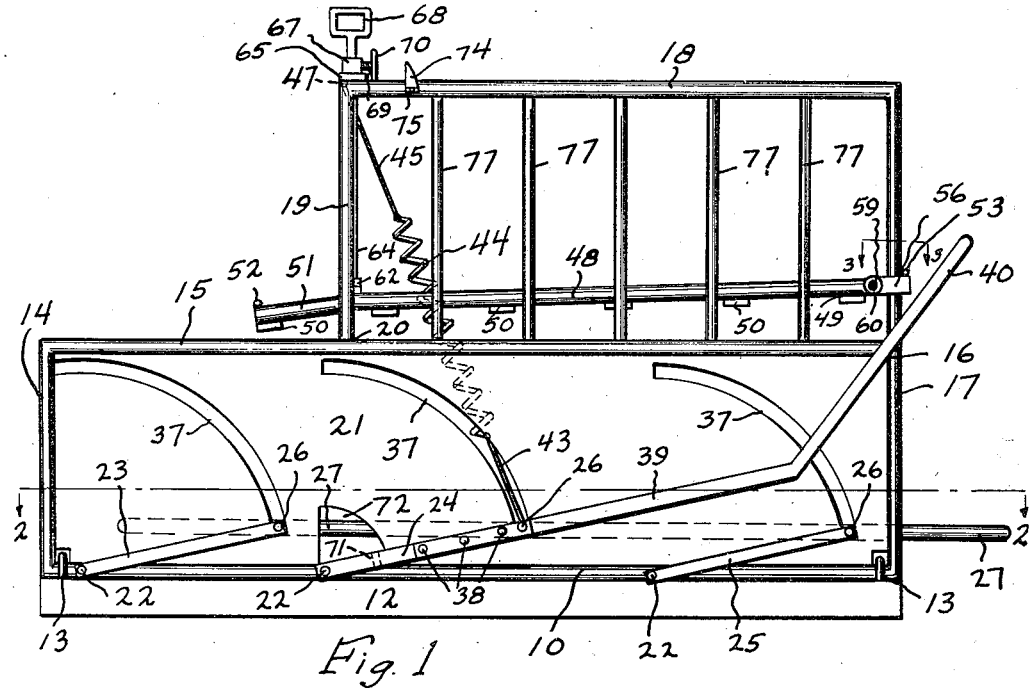
Figure 2:
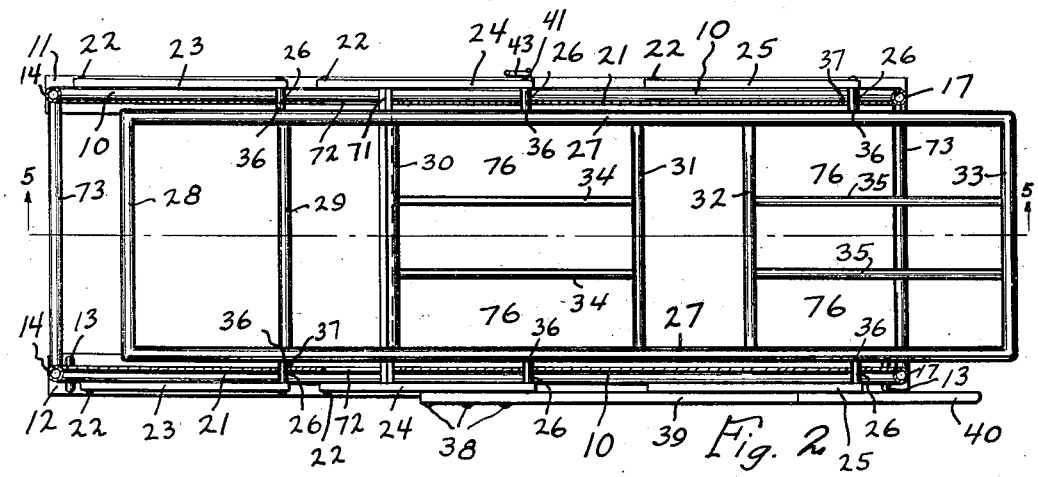
Figure 3:
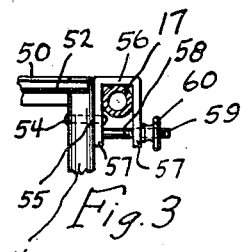
Figure 4:
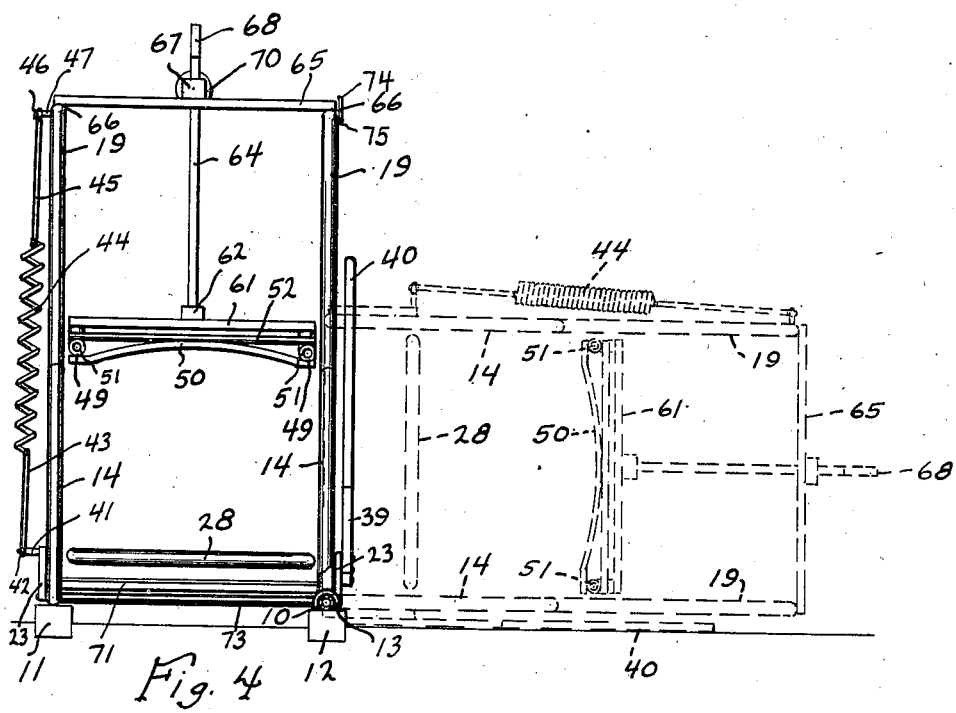
Figure 5:
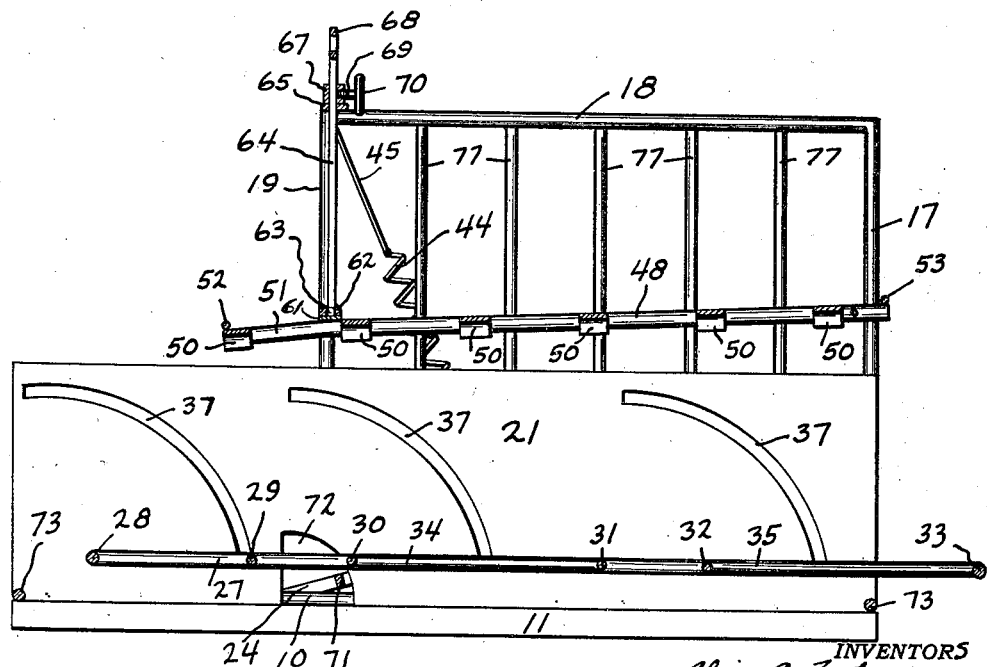

With these and other objects in view, our invention consists in the construction, arrangement, and combination of the various parts of our device, whereby the objects contemplated are attained, as hereinafter more fully set forth, pointed out in our claims, and illustrated in the accompanying drawings, in which:

Figure 1 is a side elevation of the arrangement in its vertical position,

Figure 2 is a sectional plan view taken substantially along the line 2—2 of Fig. 1, Figure 3 is a detail and taken substantially along the line 3—3 of Fig. 1, Figure 4 is a forward elevation showing the arrangement in vertical as well as horizontal position, and Figure 5 is a sectional view taken along the line 5—5 of Fig. 2.

Our invention contemplates a structure wherein which a pig or hog can be driven thereinto, and then firmly held while the various necessary operations can be performed on the animal. Our invention also contemplates means for providing a framework which can be swung over to a horizontal position so that abdominal and other under portions of the animal can be treated or operated on. This invention also includes various improvements on our application on a hog restraining device, Serial No. 243,740, filed December 3, 1938, which improvements are desired in the art, and includes certain further advantages.

We have used the character 10 to designate a pair of horizontally positioned pipes which are supported on the blocks 11 and 12. Receiving the right hand pipe 11 as shown in Fig. 1 are a pair of U-shaped bearings 13 which bearings are securely attached to the block 12. The members 10 merge into the forward vertically positioned pipe members 14 which extend into the further horizontal members 15 which members 15 terminate at 16 in the rearwardly located vertical pipes 17. A further pair of parallel pipes 18 are attached to the upper extremities of the pipes 17 and are also attached to the further forward vertical pipes 19 which are attached at 20 to the aforesaid horizontal pipes 15. Attached interiorly of, and to the pipes 10, 14, 15, and 17, are the sheet metal sides 21.

Pivoted at 22 to the side members 10 are the arms 23, 24, and 25 which arms are further pivoted by means of the pins 26 to an elevating platform which platform includes the side tubular or pipe members 27 and the transverse cross members 28, 29, 30, 31, 32, and 33. Attached between the members 30 and 31 and in suitable spaced relation are the further forwardly extending pipes 34, and a similar pair of pipe members 35 are attached between the members 32 and 33. The pins 26 which are attached to the ends of the arms 23, 24, and 25 are securely attached at 36 to the side members 27 of the raisable framework, and the arcuate slots 37 are provided in the sheet metal side walls 21 to allow passage of the members 26 therein. Attached to the central arm 24 and at one side thereof by means of suitable rivets, etc., 38 is the extended lever 39 which continues into the upwardly extending portion 40. The arm 24 opposite to this arm or at the other side of the framework includes an extended retainer 41 to which is attached at 42 the rod 43 to which is attached at the upper end thereof the strong helical tension spring 44 which is attached to the further rod 45 which rod is attached at 46 to the pin 47 which is attached at the upper corner of the framework.

The upper restraining framework includes a pair of side bars 48 to which are attached at 49 by welding or other suitable means, a series of equally spaced upwardly curved retaining bars 50. The forward ends of the side bars 48 are slightly inclined at an angle downwardly into the portion 51 and a cross rod 52 is welded to the forward ends of the members 51. The cross rod 52 prevents deviation between the fixed spacing of the side bars 48, a further rod 53 being provided at the rear end of the members 48. A pair of pins 54 (see Fig. 3) are attached through the rear ends of the side bars 48 which pins are pivoted at 55 to the U-shaped members 56 which members 56 receive the vertical posts or bars 17, and passing through the webs 57 of the U-shaped member 56 is a stud 58 which is threaded at 59, and threadably received on the threaded portion 59 are the turning nuts 60 having suitable expanded portions for graspment by the hand.

Attached forwardly across the bars 48 is the further bar 61 to which is attached the keeper 62, and received within the keeper 62 is the ball or pivotal connection 63 which is hammered over to retain the same snugly therein, and extending integrally from the ball 63 is the vertical square rod 64 which passes upwardly through a further cross plate 65 which plate 65 is attached at the upper forward ends of the bars 18 at 66. The vertical bar 64 also extends through an opening in the socket 67 and extends to the integral handle 68. Passing through one side wall of the socket 67 is the threaded stud 69 which terminates in the turning handle 70 with the end of the stud 69 being adapted to be compressed against the rod 64. Attached transversely of the frame and between the arms 24 is a further strengthening bar 71, and the sheet metal sides 21 include the quarter-circle area 72 cut out therefrom to allow passage of the member 71 as the arms are pivoted. Also attached across the forward and rearward ends of the lower corners of the framework are the further bars 73. An upper retaining ear 74 is pivoted at 75 to one of the bars 18 to retain the lever 39 in upper position, and the vertical bars 77 complete the framework.

Now that the structure of our device has been explained, we shall explain the operation thereof. The lever 39 is forced down to the horizontal position as shown in the various figures, which will bring the carriage member to the lowermost position, with the spring 44 thus being under tension. The pig or hog is then prodded into the entire framework where it will then travel over the carriage and the feet of the animal will drop into the spaces 76 or outwardly of the members 34 and 35. This arrangement of bars provides an advantageous result in that it prevents injury to the feet of the creatures which might be caused by an entire arrangement consisting entirely of cross bars only, since the cross bars would tend to compress against the feet of the animals when the carriage is down, and in this case, however, since the feet are located exteriorly of the forwardly extending rods with sufficient space being allowed, no injury can result and at the same time the feet of the animal are held in helpless position.

Next, the lever 39 is raised by means of the handle 40 which swings the lower carriage upwardly until the back of the animal is restrained by means of the arcuate straps 50. The forward downwardly inclined portions 51 of the side bars 48 provide a secure clamping effect over the neck of the animal which insures a more secure retention of the creature and a better wedging effect. The lever 40 is swung upwardly until the bar 39 passes beyond the ear 74 which can then be swung down to vertical position to hold the arrangement in place. The animal is then grasped firmly and is helpless.

An added feature of our invention is that wherein the animal is already held helpless and is then swung to a horizontal position so that the lower or nether portions can be treated. This is shown clearly in Fig. 4, and this operation is simply performed by swinging the entire frame to the right wherein the members 13 act as bearings on the right hand tube member 10, and after the arrangement is swung downwardly to the position as shown by the dotted lines the animal is still held in helpless position while the necessary operation, etc., is performed, after which the frame is swung to vertical position again. This provides an important feature to our invention in that it is very difficult to get at the lower portions of the creature when it is in the vertical position, and this, then, provides a convenient means for easily swinging the frame to the desired position. It should be noted that when the carriage passes upwardly, the spring 44 assists in the raising action and materially assists the operator in bringing the carriage upwardly, which is important in the case of heavier or larger hogs and also facilitates the operation.

After the animal is treated, the lever 39 is forced downwardly again and the creature will travel through the forward end between the vertical bars 14 and the next creature is then prodded into the frame. It is necessary, for different sized animals, to provide an adjustable retainer which can be readily accommodated for different sizes in a minimum of time and with adjusting means which can be readily and manually controlled without the necessity of cumbersome threaded or other arrangements. This is provided by means of the structure already explained and it will be noted that the U-shaped members 56 can be placed at any desired location on the vertical bars 17 after which they are clamped thereto by means of the nut 60 which is engaged with the stud 58. However, the pin 54 is constantly in free pivotal engagement with one of the webs 57 which allows a quick pivoting action. The forward end of the arrangement can be quickly raised or lowered by merely grasping the handle 68 and pulling upwardly on the rod 64 or allowing it to drop after the stud 69 has been loosened. After the desired position of the restraining frame is adjusted, the hand member 70 is turned firmly carrying the stud 69 against the rod 64, thereby locking the entire framework in firm and fixed position. It will be seen by this adjustable structure, then, that on different runs the adjustment can be effected quickly and with a minimum of effort.

It will now be seen that our hog restraining device accomplishes all of the objects mentioned as well as various other advantages being readily apparent.

Some changes may be made in the construction and arrangement of the parts of our invention without departing from the real spirit and purposes of our invention, and it is our intention to cover by our claims any modified forms of structure or use of mechanical equivalents which may be reasonably included within their scope.

We claim as our invention:

1. A hog restraining device comprising an animal receiving framework, an upper restraining member attached to the framework, a plurality of spaced arms pivotally attached to the framework, a raisable platform pivotally attached to the other ends of said arms, means for raising said arms to raise the platform, including an extended lever attached to said raisable platform and pivotally attached to the framework, and a spring attached to one of said arms at one end and to an upper portion of the framework at the other end to assist in raising said platform as said extended lever is raised, said upper restraining member including a downwardly inclined forward portion to provide a relatively constricted opening, pivotal movement of said arms causing said platform to swing forwardly toward said constricted opening.

2. A hog restraining device comprising an animal receiving framework, an upper restraining member attached to the framework, a plurality of spaced arms pivotally attached to the framework, a raisable platform pivotally attached to the other ends of said arms, means for raising said arms to raise the platform, including an extended lever attached to said raisable platform and pivotally attached to the framework, and a spring attached to one of said arms at one end and to an upper portion of the framework at the other end to assist in raising said platform as said extended lever is raised, said upper restraining member including a downwardly inclined forward portion to provide a relatively constricted opening, and means for adjustably positioning said upper restraining member including a pair of U-shaped members attached at the rearward ends thereof, said framework including vertical rods engaged with said U-shaped members, and means for tightening said U-shaped members against said rods, said restraining member being pivoted to said U-shaped members.

3. A hog restraining device comprising an animal receiving framework, an upper restraining member attached to the framework, a plurality of spaced arms pivotally attached to the framework, a raisable platform pivotally attached to the other ends of said arms, means for raising said arms to raise the platform, including an extended lever attached to said raisable platform and pivotally attached to the framework, and a spring attached to one of said arms at one end and to an upper portion of the framework at the other end to assist in raising said platform as said extended lever is raised, said upper restraining member including a downwardly inclined forward portion to provide a relatively constricted opening, and means for adjustably positioning said upper restraining member including a pair of U-shaped members attached at the rearward ends thereof, said framework including vertical rods engaged with said U-shaped members, means for tightening said U-shaped members against said rods, said restraining member being pivoted to said U-shaped members, and means for adjustably supporting the forward end of said restraining member including a vertical bar pivotally attached thereto, a handle at the upper end of said bar, and means for retaining said bar in desired position.

4. A hog restraining device comprising an animal receiving framework, an upper restraining member attached to the framework, a plurality of spaced arms pivotally attached to the framework, a raisable platform pivotally attached to the other ends of said arms, means for raising said arms to raise the platform, including an extended lever attached to said raisable platform and pivotally attached to the framework, and a spring attached to one of said arms at one end and to an upper portion of the framework at the other end to assist in raising said platform as said extended lever is raised, said upper restraining member including a downwardly inclined forward portion to provide a relatively constricted opening, and means for adjustably positioning said upper restraining member including a pair of U-shaped members attached at the rearward ends thereof, said framework including vertical rods engaged with said U-shaped members, means for tightening said U-shaped members against said rods, said restraining member being pivoted to said U-shaped members, and means for adjustably supporting the forward end of said restraining member including a vertical bar pivotally attached thereto, a handle at the upper end of said bar, means for retaining said bar in desired position, including a socket receiving said bar, and a lock stud threadably received in said socket and adapted to be compressed against said bar.

5. A hog restraining device comprising an animal receiving framework, an upper restraining member attached to the framework, a plurality of spaced arms pivotally attached to the framework, a raisable platform pivotally attached to the other ends of said arms, means for raising said arms to raise the platform, including an extended lever attached to said raisable platform and pivotally attached to the framework, and a spring attached to one of said arms at one end and to an upper portion of the framework at the other end to assist in raising said platform as said extended lever is raised, a supporting frame upon which said animal receiving framework rests, said animal receiving framework being pivoted thereto at one side thereof to provide means whereby said animal receiving framework can be swung to a horizontal position, said raisable platform including parallel side bars, transverse cross bars therebetween, further substantially lengthened longitudinal bars attached between said transverse bars and parallel to said side bars to provide spaces adjacent thereto to receive the feet of the animal in unrestricted relation.

ALVIN A. FOSTERMAN.
LOUIS O. MARSHALL.